United States Patent
Kuroodi et al.

(10) Patent No.: US 7,243,254 B1
(45) Date of Patent: Jul. 10, 2007

(54) LOW POWER MEMORY CONTROLLER THAT IS ADAPTABLE TO EITHER DOUBLE DATA RATE DRAM OR SINGLE DATA RATE SYNCHRONOUS DRAM CIRCUITS

(75) Inventors: Vijendra Kuroodi, Cupertino, CA (US); Geeta Desai, Saratoga, CA (US); Eric Hung, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 495 days.

(21) Appl. No.: 10/701,639

(22) Filed: Nov. 5, 2003

(51) Int. Cl.
*G06F 1/04* (2006.01)
(52) U.S. Cl. ......................... 713/600; 711/167; 711/170
(58) Field of Classification Search .................... 713/1, 713/2, 100, 600; 711/167
See application file for complete search history.

(56) References Cited

U.S. PATENT DOCUMENTS

| | | | | |
|---|---|---|---|---|
| 6,060,916 A | * | 5/2000 | Park ............................. | 327/99 |
| 6,151,271 A | * | 11/2000 | Lee .............................. | 365/233 |
| 6,151,664 A | * | 11/2000 | Borkenhagen et al. ....... | 711/150 |
| 6,415,390 B1 | * | 7/2002 | Manning ..................... | 713/501 |
| 6,791,889 B2 | * | 9/2004 | Peterson ..................... | 365/193 |
| 6,795,906 B2 | * | 9/2004 | Matsuda ..................... | 711/167 |

OTHER PUBLICATIONS

"Double Data Rate (DDR) SDRAM Specification", JEDEC Standard, JESD79D, Jan. 2004.

"TN-46-05, General DDR SDRAM Functionality", Micron Technology, Jul. 2001.

* cited by examiner

*Primary Examiner*—Rehana Perveen
*Assistant Examiner*—Paul Yanchus, III
(74) *Attorney, Agent, or Firm*—Daffer McDaniel LLP

(57) ABSTRACT

A memory controller is provided and a method for transferring data between the memory controller and a memory device. The memory controller can be implemented on an integrated circuit that also contains an execution unit. The execution unit can be clocked at a first clock rate, whereas the memory controller can be selectively clocked at either the first clock rate or a second clock rate that is approximately one-half frequency of the first clock rate. By clocking the memory controller at either the first clock rate or the second clock rate, the memory controller can accommodate different types of semiconductor memory. For example, the memory controller can control single data rate (SDR) DRAM memory if it is clocked at a first clock rate. Conversely, the memory controller can control double data rate (DDR) DRAM memory if it is clocked at approximately one-half the first clock rate. By selectively clocking the memory controller at different clocking rates, the memory controller need not be modified in hardware, yet can accommodate different memory devices by allowing a user to simply plug one type of memory into a receptacle rather than another depending on the cost constraints and user application. Therefore, the memory controller is adaptable during a power-on reset in which the computer system is initialized to automatically receive and control different types of memory selected by a user.

7 Claims, 3 Drawing Sheets

LOW POWER MEMORY CONTROLLER THAT IS ADAPTABLE TO EITHER DOUBLE DATA RATE DRAM OR SINGLE DATA RATE SYNCHRONOUS DRAM CIRCUITS

BACKGROUND OF THE INVENTION

1. Field of Invention

This invention relates to semiconductor memory and, more particularly, to a low power memory controller embodied upon an integrated circuit for selectively controlling either a single data rate (SDR) synchronous dynamic random access memory (SDRAM) or a double data rate (DDR) DRAM.

2. Description of Related Art

The following descriptions and examples are not admitted to be prior art by virtue of their inclusion within this section.

There are numerous types of memories available in the marketplace. For example, large volumes of data can be stored in magnetic memory, such as a hard disk drive. Lesser quantities of data can be stored in memory arranged upon an integrated circuit, oftentimes referred to as "semiconductor memory." Semiconductor memory is typically arranged closer to the core logic unit or execution unit (oftentimes referred to as the "execution engine") than the hard disk drive, and can be accessed much faster than the disk drive.

Common to semiconductor memory is an array of storage cells. Depending on the function of the semiconductor memory, each storage cell can have a significantly different architecture and function. For example, semiconductor memory can be volatile or non-volatile. Types of volatile memory include memory that must be periodically refreshed (DRAMs) or memory that will lose its programmed state if power is removed (SRAMs).

The differences between SRAMs and DRAMs are fairly significant. For example, each cell of SRAM includes latch and pass transistors. Conversely, each cell of DRAM involves simply one transistor. While DRAMs are significantly denser than SRAMs, DRAMs require additional support circuitry to coordinate the access of each cell, along with the need to periodically refresh that cell. Since SRAMs typically have faster access times than DRAMs, SRAMs are oftentimes used as the primary cache of the microprocessor or execution unit. DRAMs, on the other hand, are generally used as the main semiconductor memory and are controlled by a memory controller linked to the execution engine typically by a memory bus or system bus. Each transaction between the execution engine and the memory involves a particular bus cycle.

There are numerous types of DRAMs, some of which are: fast page mode DRAMs, extended data out DRAMs, burst extended data out DRAMs, and the more recent synchronous DRAMs (or SDRAMs). Unlike DRAMs, SDRAMs take advantage of the fact that memory accesses by the execution unit are typically sequential. SDRAMs are designed to fetch all bits within a particular burst in sequential fashion by allowing the column address to be incremented sequentially and in sync with the system clock of the execution engine or processor. This allows an SDRAM one important advantage over other forms of asynchronous DRAMs: data transfer delivery from the SDRAM at burst rates exceeding, for example, 100 MHz.

Along with a decrease in access time of the SDRAM came yet another enhancement. Instead of providing source-synchronous data capture at the clock frequency, double data rate (DDR) SDRAM allows data to be captured at a rate of twice the clock frequency. This is accomplished by utilizing a 2n-prefetch architecture, where the internal data bus of the DDR SDRAM is twice the "n" width of the external data bus to allow data capture of twice per system clock cycle. Details of the difference between a single data rate (SDR) SDRAM and DDR SDRAM are set forth in "General DDR SDRAM Functionality," Micron Technology 2001 (herein incorporated by reference).

While both SDR and DDR memory devices include the same core memory array of cells, the input/output (I/O) interface is considerably different. For example, DDR utilizes a differential pair of system clock signals (CK and #CK) to formulate the triggering rising and falling clock edges, and data strobe (DQS) signals are needed to drive the data signal (DQ) to and from the DDR-accessed memory banks. In addition to its double data rate operation, DDR DRAMs often use memory banks that operate similar to virtual channels. The size of the memory bank can vary and, depending on the overall capacity of the memory module, a memory bank can possibly include an entire semiconductor memory device.

Most modern semiconductor memory units are configured as a memory module, with multiple DRAMs placed upon a printed circuit board (PCB). The DRAMs can be configured in a single line or in two lines to form a single inline memory module (SIMM) or a dual inline memory module (DIMM). The SIMM or DIMM unit is readily replaceable since it typically employs edge connectors that slide into a bus receptacle.

In order to control the memory module that can utilize two or more banks of memory arrays for interleaved operations, a memory controller is needed. In many applications, the memory controller is embodied on the same integrated circuit as the execution engine. The combination of execution engine and memory controller can be formed as an application specific integrated circuit (ASIC) or as a programmable logic unit, such as a gate array or programmable logic array (PLA).

As the price and market demand for semiconductor memory changes, it is desirable to be able to change out the semiconductor memory for the cheaper or higher-performing type of memory. However, it is typically difficult to easily modify the memory controller to accommodate, for example, SDRAM instead of DRAM. For example, a user might want to replace SDR SDRAM with faster DDR DRAM, or DDR SDRAM. As the market demand for higher speed DDR increases, the costs associated with making DDR on a per-byte basis might also steadily decline compared to the SDR counterpart. However, depending on the availability of SDR versus DDR, it would be desirable to employ a memory controller that can accommodate either. Yet, existing memory controllers formed on an integrated circuit with an execution engine cannot be readily adapted to either forms of memory, either because the memory controller is fixed in its ASIC design or the functionality of the memory controller suited for SDR cannot be readily modified to accommodate, for example, the DQS signals and latching on both the rising and falling clock edges. As the market for DRAMs constantly evolves, a need exists for a memory controller that can accommodate SDR or DDR memory, such as SDR SDRAM or DDR DRAM without any modifications to the memory controller hardware.

SUMMARY OF THE INVENTION

The problems outlined above are in large part solved by an improved memory controller. The memory controller hereof can be used to control various types of DRAM, such as SDR or DDR DRAM. The memory can be embedded on the same PCB as the memory controller or, alternatively, the memory can be placed on a separate PCB, such as a SIMM or DIMM. In either instance, the memory controller can accommodate SDR or DDR DRAM memory types, such as SDR SDRAM or DDR DRAM without any modification to the memory controller hardware. Thus, users can simply "plug-and-play" different types of DRAM memory into the computing system without having to modify the execution engine or the memory controller. This implies that the execution unit and memory controller can be arranged on a common integrated circuit, as an ASIC, PLA, etc. As the market changes and the costs associated with one type of memory makes DDR DRAM more attractive than, for example, SDR SDRAM, a user can simply replace the SDR SDRAM with DDR DRAM without making any changes to the integrated circuit which bears the execution unit and memory controller.

The ability of the memory controller hereof to control either SDR or DDR semiconductor memory is but one benefit. For example, the memory controller can be used to control a SDR SDRAM, which has a system clock used to synchronize data between the memory controller and the execution unit. In addition, a controller clock can be used to synchronize data between the memory controller and the external memory. If SDRAM external memory is used, it is generally known that the system clock must be synchronized to the controller clock. For example, if the execution engine is synchronized to a 150 MHz system clock, the data transfer rate between the memory controller and the external memory must be synchronized to the controller clock, also transitioning at 150 MHz. Thus, for SDRAM applications, the system clock between the execution unit and the memory controller is synchronized to the controller clock between the memory controller and the external memory.

For DDR applications, the controller clock is purposely designed to transition at ½ frequency of the system clock. This will ensure that when data is sampled on both the leading and trailing edges of the controller clock, the data transfer rate is at the same frequency as the system clock. This will allow a memory controller that might be set up to control SDRAM to also control DDR DRAM by reducing the controller clock by ½ frequency. Reducing the controller clock occurs when the SDR SDRAM is swapped for DDR DRAM, for example. When the controller clock is reduced in frequency, the various latching, buffering, and driving circuitry associated with the memory controller will consume considerably less power compared to when a full clocking rate is used.

Using the above example, a system clock which transitions at 150 MHz will dictate a controller clock transitioning at 75 MHz. While the true and complementary clock signals sent between the memory controller and the external memory transitions at 75 MHz, the data transfer rate is double when using DDR DRAM. Beneficially, a lower specified operating speed can be applied to the external memory and, therefore, a less costly external memory rated at 100 MHz maximum can be used rather than the higher speed variety of 133 MHz DRAM. This is true because the external clocking signals need only achieve 75 MHz rather than 150 MHz. Not only is the memory controller adaptable to select between a higher and lower controller clocking rate, but also when a slower clocking rate is chosen, a less costly lower-speed external memory device can be used.

According to one example, the memory controller can be switched between a higher speed clocking rate suitable for SDR DRAM applications and a slower clocking rate suitable for DDR DRAM applications. The switching function can be achieved during power-on reset of the integrated circuit that bears the memory controller. Power-on reset can occur when power is applied to the integrated circuit, possibly during initial activation of the overall computing system. When power is applied, an external binary value can be latched onto, for example, a multiplexer. The multiplexer will select between the system clock and another clock that is one-half frequency of the system clock. Whatever clock rate is chosen by the external signal, that clock rate is applied to the memory controller, and remains active throughout operation of the memory controller. Alternatively, instead of programming the latch externally, the latch can be programmed from an internal configuration register. The configuration register can be programmed from an instruction that is fetched during the power-on sequence. Once configured with the appropriate bit value, the configuration register will then dictate to the latch whether the higher system clock rate or the lower one-half system clock rate will be used.

It is contemplated that whatever rate is chosen as the controller clock, that rate will be maintained by the latch until the next power-on reset or initialization cycle occurs. If the external memory is to be changed from, for example, SDR SDRAM to DDR DRAM, or vice-versa, changes will occur when power is absent from the integrated circuit containing the memory controller. Once the changeover is completed, the integrated circuit receives power and proceeds through the power-on reset sequence to latch in the binary value that will dictate the clock frequency of the memory controller for the external memory that is currently connected to the controller, and which will replace the previous memory during the changeover process.

According to one embodiment, an integrated circuit is contemplated. The integrated circuit includes both an execution engine and a memory controller configured on the same monolithic substrate. The execution engine is clocked at a first clock rate or system clock rate. The memory controller can be selectively clocked at either the first clock rate or a second clock rate that is approximately one-half frequency of the first clock rate. Regardless of whether the memory controller is clocked at the first or second clock rate, the memory controller will always produce the same data transfer rate between an external memory and the integrated circuit. Preferably, the memory controller is clocked at the first clock rate during times in which every other transition (i.e., SDR) latches data, and the memory controller is clocked at the second clock rate during times in which data is latched on every transition (i.e., DDR).

According to yet another embodiment, a computer is contemplated. The computer includes an execution unit, a memory controller, a memory device, and a data bus coupled between the memory controller and the memory device. The execution engine is clocked at a first rate and the memory controller is clocked at either the first rate or a second rate approximately one-half the first rate. The data bus transfers data at substantially the first rate regardless of whether the memory controller is clocked at the first rate or the second rate. The memory device preferably comprises SDR SDRAM during a first time in which the memory controller is clocked at the first rate. The memory device preferably comprises DDR DRAM during a second time in which the memory controller is clocked at the second rate. Thus, the memory device can be interchanged in an interim in which the execution engine and the memory controller are powered down. However, when SDRAM is present, the memory controller is clocked at the first rate and when DDR DRAM is present, the memory controller is clocked at the second rate.

According to yet another embodiment, a method is contemplated. The method is used for transferring data between a memory controller and a memory device. The method includes the steps of clocking the memory controller at either a first rate or a second rate that is approximately one-half the first rate. The memory device can be clocked at the first rate and, specifically, not the second rate. Data is transferred between the memory controller and the memory device at the first rate regardless of the rate at which the memory controller is clocked (i.e., regardless of whether the memory controller is clocked at the first rate or the second rate).

BRIEF DESCRIPTION OF THE DRAWINGS

Other objects and advantages of the invention will become apparent upon reading the following detailed description and upon reference to the accompanying drawings in which.

Figure 1:
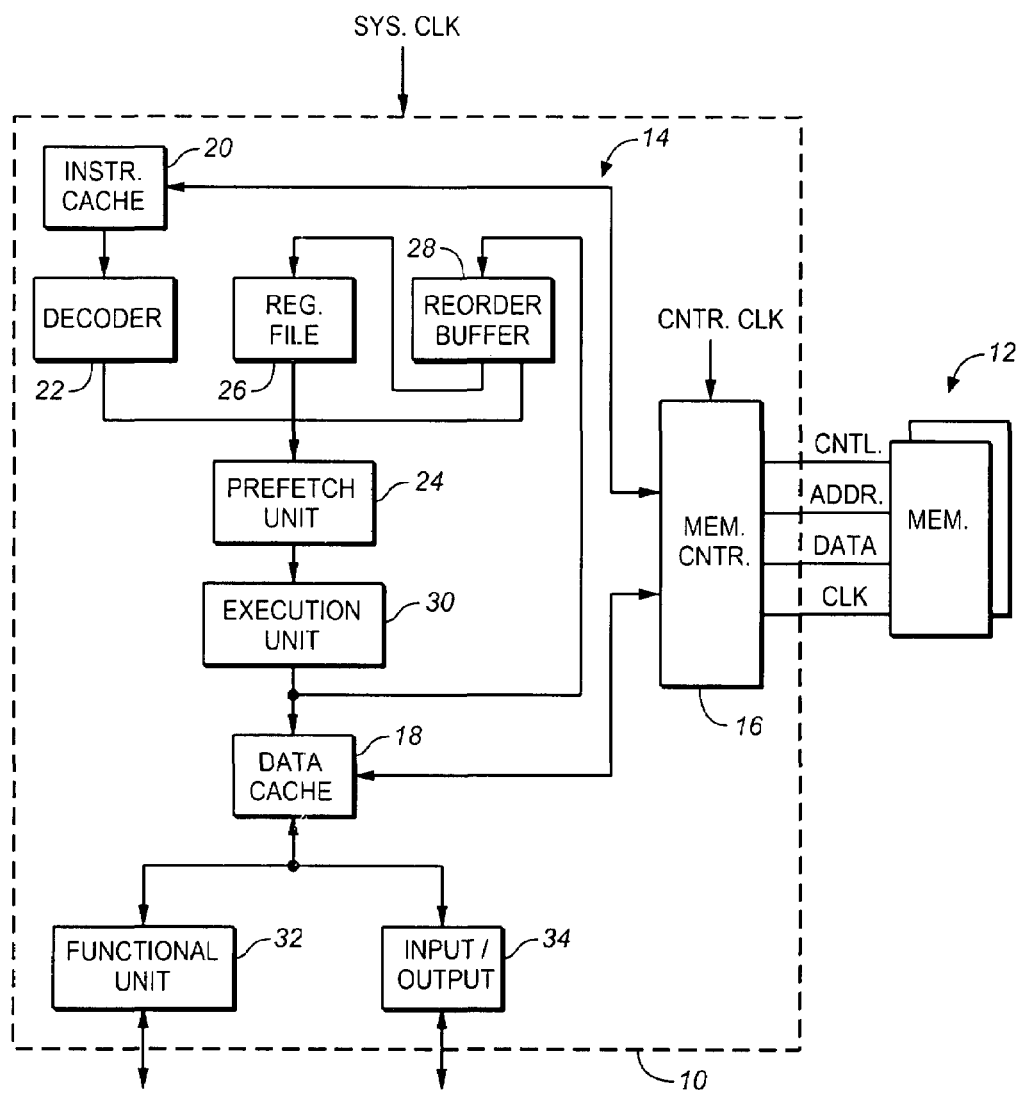
FIG. 1 is a block diagram of an execution engine and memory controller placed on a single monolithic semiconductor substrate, with the memory controller configured to control one or more banks of semiconductor memory.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates a block diagram of various functional blocks within an integrated circuit 10 connected to external memory 12. External memory 12 is shown having several input/output pins, some of which are reserved for control, address, data, and clock pins that are coupled to pins of memory 12 via, for example, trace conductors within a substrate, such as a PCB. Within integrated circuit 10 are essentially two major subsystems: an execution engine 14 and a memory controller 16.

Execution engine 14 is illustrated in part. Preferably, execution engine 14 is a processor. A processor is known to incorporate two operational units: an integer unit and a floating-point unit. These units communicate data via a data cache 18 drawn from, for example, external memory 12. The integer and floating-point units are controlled by a single instruction stream supplied by instruction cache 20. The instruction stream can be drawn from external memory 12, for example. Instruction cache 20 can supply multiple instructions per fetch if, for example, the processor is a superscalar processor. The actual number of instructions fetched can vary. As the instructions are dispatched from instruction cache 20, decoder 22 decodes those instructions and places them into prefetch unit 24.

Prefetch unit 24 works in conjunction with register file 26 and reorder buffer 28 to handle both in-order and out-of-order issues into functional units of execution unit 30. While it generally easy to provide the required instruction bandwidth for sequential instructions since prefetch unit 24 can simply fetch several instructions per cycle in blocks of multiple instructions, it is much more difficult to provide instruction bandwidth in the presence of non-sequential fetches caused by, for example, branches.

Reorder buffer 28 works with the branch prediction techniques to align and merge back into the sequence of instructions various out-of-order instruction issues. The branch prediction can occur either in hardware or software by essentially predicting the outcomes of branches during instruction fetching without waiting for the functional unit 32 to indicate whether or not the branches should be taken. Prefetch unit 24 functions to hold all un-issued instructions regardless of the functional units (e.g., branch functional unit, ALU functional unit, shift functional unit, load functional unit, and store functional unit) within execution unit 30. Only the integer functional units are shown, prefetch unit 24 may be duplicated in the floating-point unit, depending on the implementation of the floating-point unit.

In addition to the functional units within the execution unit 30 producing various data that is temporarily stored in data cache 18, data can also arise from other functional units 32, external to the data flow path of the processor. Functional unit 32 can be attributed to, for example, the data flow path of an external data bus, such as a PCI bus. In addition to external functional units 32, data can also be input directly into the data flow stream or output from the data flow stream directly. The direct input and output of data is shown by block 34. For example, direct memory access can be implemented from a peripheral to and from semiconductor memory 12 without involving an instruction cycle of the processor.

The various blocks shown as reference numerals 18–34 can be synchronized to a system clock, where data is latched on either the rising or falling edges of the system clock. Memory controller 16, however, is synchronized to a controller clock. If it is desired that memory accesses by the execution engine be sequential and synchronized with the system clock, then the controller clock will transition at the same rate as the system clock. Synchronizing the controller clock and the system clock at the same frequency causes synchronous accesses to the memory and, to take advantage of the synchronous accesses, SDRAMs are employed as external memory 12. One advantage of SDRAM accesses is that whenever a burst access is needed, column addresses are accessed at the same rate as the system clock, and are incremented sequentially for however many number of bursts accesses are needed. This substantially lessens the access time compared to asynchronous DRAMs that require certain control signals at the interim of each of the sequence of column accesses.

FIG. 1 illustrates only the basic signals needed between memory controller 16 and external memory 12 assuming SDRAM is employed. If, however, DDR DRAM continues is price decrease, then it may be beneficial to swap out the SDRAM for DDR DRAM. Specifically, a user may wish to replace SDR SDRAM with DDR DRAM, in which case additional control, power, and clock signals may be needed, as well as certain modifications to the clock rate.

Figure 2:
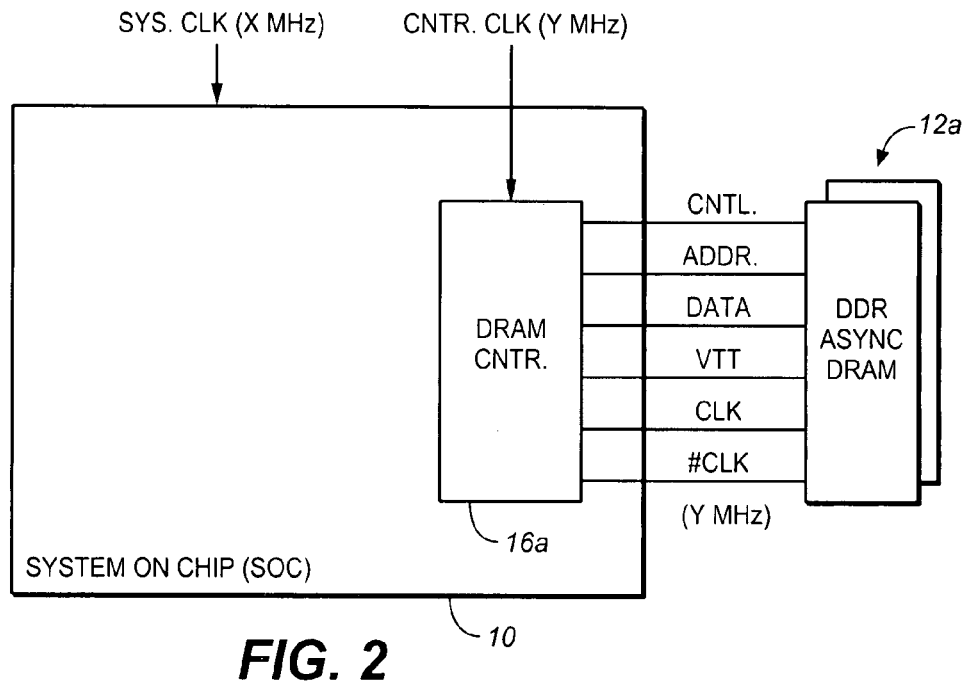
FIG. 2 is a block diagram of the execution engine and memory controller clocked at dissimilar rates for transferring data asynchronously between the execution unit and DDR DRAM semiconductor memory.

FIG. 2 illustrates the rudimentary features of a DDR DRAM interface. Specifically, FIG. 2 indicates the need for an additional, complementary, clock signal as well as another reference voltage ($V_{TT}$) to which termination resistors are connected if DDR DRAM is employed. If the memory controller is to be operational as a DRAM controller 16a, then the true and complementary clock signals can transition at a rate different from the system clock to produce asynchronous data transfer. Thus, DDR DRAM 12a is shown as DDR asynchronous DRAM. Asynchronous data transfer is defined to mean the data transfer rate, which is twice the true and complementary clock frequency if DDR is employed, is dissimilar from the system clock rate. For example, if the system clock rate is 150 MHz, then the data transfer rate might be 266 MHz, 333 MHz, or 400 MHz, each of which are suitable for DDR DRAM rated at 266 MHz, 333 MHz, or 400 MHz. To achieve, for example, 266 MHz, the true and complementary clock signals must transition at Y=133 MHz. Since 133 MHz is different from 150 MHz, data transfer is said to be asynchronous.

Figure 3:
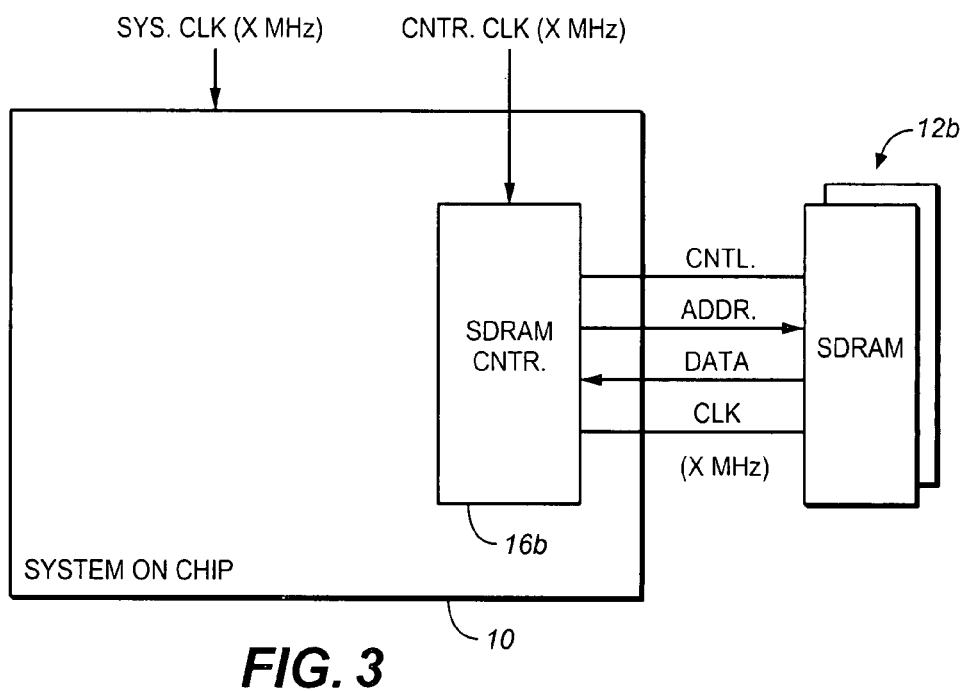
FIG. 3 is a block diagram of the execution engine and memory controller clocked at the same rate for transferring data synchronously between the execution unit and SDRAM semiconductor memory.

FIG. 3 illustrates an example in which data transfer is synchronous, with SDRAM employed. Instead of the memory controller being a DRAM memory controller, FIG. 3 illustrates an SDRAM memory controller 16b. The SDRAM memory controller is clocked by a controller clock at the same rate as the system clock, to produce a clocking signal forwarded to the SDRAM external memory 12b of X MHz—the same frequency as the system clock of X MHz. If the SDRAM is instituted as SDR, then the data transfer rate is also equal to the clock transition rate or X MHz.

In many instances, however, the memory controller must be adaptable to either a DRAM controller (specifically DDR DRAM or DDR SDRAM) or SDRAM (specifically SDR SDRAM). A memory controller that is adaptable to either memory application must also be one that requires no hardware modification. In order to achieve full adaptability, the only modification is that which is achieved in software, by either configuring a register during boot-up or inputting a logic value onto a pin during power-on reset.

Figure 4:
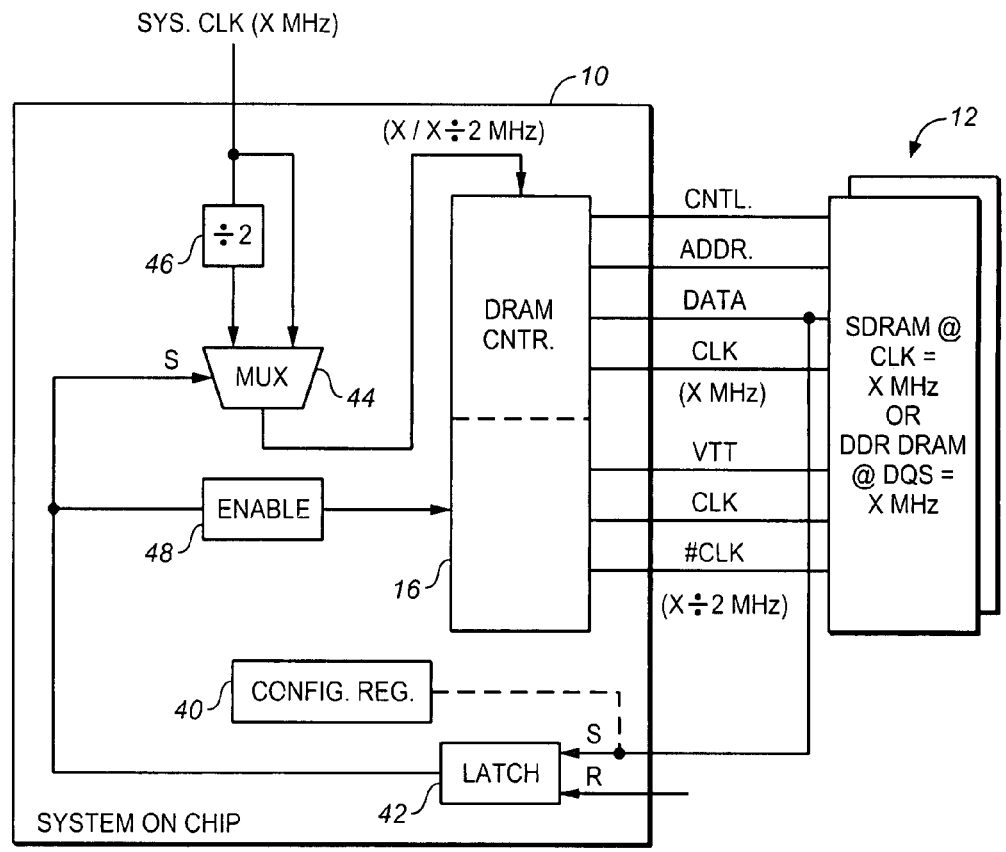
FIG. 4 is a block diagram of the execution engine clocked at either the same rate or twice the rate as the memory controller for transferring data synchronously between the execution unit and the SDRAM or DDR DRAM semiconductor memory, respectively.

FIG. 4 illustrates the various hardware elements used to perform clock selectivity. The hardware elements do not change and remain fixed, yet the software used to apply signals into the configuration register 40 or latch 42 do change depending on which clock rate is selected. Those signals are derived from an instruction that is executed during boot-up or power-on reset. The instruction will produce a signal sent to the set and reset inputs of the latch, either directly or via configuration register 40. For example, the instruction can be executed during the basic input/output sequence (BIOS) of the computing system. If the signal is sent to the input pin bearing the set input of latch 42, possibly one pin of multiple pins attributed to the data bus can be used, as shown.

For example, the $DQ_X$ pin (or any other pin for that matter) might be reserved during boot-up to accommodate a particular binary logic value. For example, a logic "1" can be used to select a second clock rate that is ½ a first clock rate, whereas logic value "0" can be reserved to select the first clock rate. During the boot-up sequence, whatever value is on the reserved data pin is latched at the output of latch 42 even after the boot-up sequence has expired. Thus, the data pin can be used thereafter to send and receive data between memory controller 16 and memory 12. It is only during the boot-up sequence that the reserved data pin is used to receive the frequency selection signal.

Once power is removed from integrated circuit 10, the power-down sequence can institute a logic value on the reset input pin to latch 42. This will cause the output of latch to reset. Alternatively, the reset can occur immediately before the set during the power-on (or boot-up) sequence. In either instance, the clock frequency selection signal maintained on the output of latch 42 is presented to the select input of multiplexer 44. Multiplexer 44 is shown having two inputs: either the system clock or the system clock having a frequency that is reduced by one-half. Divider 46 performs the reduction in frequency.

Along with selecting either the system clock or approximately ½ the system clock, the selectivity signal from latch 42 also activates enable circuit 48 if the signal is at the appropriate logic value. The enable circuit serves to enable a part of the memory controller 16 needed to activate various other signals used for DDR control and access. Enable circuit 48 thereby activates or "awakens" a certain portion of the memory controller so that if a reduced system clock frequency is chosen by multiplexer 44, enable circuit 48 will also activate the DDR control portions of controller 16.

While latch 42 can be programmed from external pins, latch 42 can also be programmed from internal pins. Specifically, a configuration register 40 can have a bit reserved within a field of bits. That reserved bit can have a logic 1 or logic 0 value coupled to the set input of latch 42. If, for example, a logic 1 value is programmed into that particular bit field, then the logic 1 value can set latch 42 to produce a selectivity signal that will select a clock frequency that is ½ the system clock (i.e., X/2 MHz). The configuration register 40 can be programmed during BIOS operations, for example, to store the configuration bit needed for activating either the full X MHz system clock or X/2 MHz system clock. Regardless of whether a configuration register is used internally or externally, or configuration is driven by a particular input pin on integrated circuit 10, once a particular bit value is programmed into the set input of latch 42, latch 42 output will activate the enable circuit 48 whenever DDR control is needed.

DDR control involves many control signals that are different from SDR control. Specifically, SDR generally involves control signals, address signals, data signals, and a single clocking signal. However, if DDR is needed, in addition to the control, address, and data signals, two clocking signals are needed: a true clocking signal and a complementary clocking signal. The true and complementary clocking signals are merged to produce a signal that causes data to be latched on both the leading and trailing edges of the merged clocking signal. In addition, DDR also requires a separate reference supply voltage ($V_{TT}$). The reference supply voltage is used to apply power to the output driver and receiver circuits, as well as applying a pull-up voltage to determination resistors of DDR signals sent according to the JEDEC standard.

Specifically, the JEDEC standard for DDR transmissions calls out the stub-series terminated logic (SSTL) specification by which the various address and data bus pins are terminated at both controller 16 and external memory 12.

The various features of SSTL_2 are described in the JEDEC standard, JEDEC Solid State Technology Association, December, 2000 (herein incorporated by reference). One benefit of the JEDEC standard is that the drivers and receivers are powered at a substantially reduced voltage value. For example, the voltage value for the data lines (DQ) is typically referred to as $V_{DDQ}$, which is defined to be less 2.5 volts or less. This allows for a lower power controller and memory device. The termination voltage or $V_{TT}$ is essentially a reference voltage that is approximately equal to ½ of $V_{DDQ}$, for reasons described in the JEDEC standard.

For purposes of the description set forth in FIG. 4, the memory controller 16 must be adaptable to produce not only the signals needed for SDR communication, but also all signals needed for DDR communication. This entails producing the separate power supply voltage $V_{DDQ}$ and $V_{TT}$, as well as the true and complementary clock signals CK and #CK. Furthermore, DDR communication also implements a data mask (DM) and data strobe (DQS) signals. DQS is generally a strobe signal that transitions at twice the true or complementary clock rate and dictates the data transfer rate of the bits of data sent across the data bus. SDR does not utilize a data strobe since data transfer is synchronized to the singular clock, not DQS that is twice the transfer rate as the singular clock.

By utilizing either the system clock or ½ the system clock, memory controller 16 can control either an SDR SDRAM or a DDR DRAM, respectively. If the system clock of X MHz is used, then the singular clock will transition at X MHz and memory accesses within the SDRAM will occur at a rate of X MHz. However, if DDR DRAM is used, then the memory controller 16 will use one-half the system clock. The true or complementary clock signal will transition at one-half the system clock or X/2 MHz. However, since DQS transitions at twice the true or complementary clock rate, the data transfer and accesses to the DDR DRAM will occur at X MHz. Thus, memory controller 16 can be used to control either SDR or DDR memory by simply changing the clock speed within the controller itself.

In addition, certain functions or features within the controller can be selectively activated to accommodate the additional control features used by DDR versus SDR. For example, SDR typically uses low voltage TTL (LVTTL) as the signal interface whereas DDR uses SSTL_2. LVTTL requires a power supply of approximately 3.3 volts whereas SSTL merely requires a power supply of 2.5 volts or lower. SDR is synchronous to the system clock whereas DDR is source-synchronous to the bi-directional data strobe or DQS. Thus, DDR can be made synchronous to whatever rate DQS happens to be which, in the example shown, is synchronous to the SDR data transfer rate since backward capability between SDR and DDR is desired.

SDR generally employs a N-prefetch architecture whereas DDR employs a 2N-prefetch architecture, where the internal data bus is twice the width of the external bus. This allows the internal memory cell to pass data to the input/output buffers in pairs. With DDR, there is no output enable for read operations, but DDR does support a burst terminate command to quickly end a read in process. During a write operation, the DM signal is available to allow the masking of non-valid write data. Since DDR utilizes a differential pair for the system clock, there must also be a true clock and a complementary clock. Positive clock edge for DDR refers to the point where the rising clock signal crosses with the falling complementary clock signal, and the term negative clock edge indicates the transition of the falling clock and the rising complementary clock signals.

Details of the 2N-prefetch architecture is set forth in "General DDR SDRAM Functionality," Micron Technology 2001.

Figure 5:
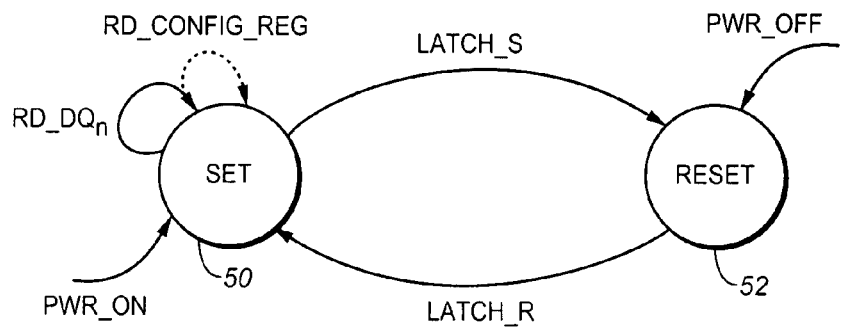
FIG. 5 is a state diagram of the two modes in which the memory controller can be programmed during power-on-reset to receive two different clock rates and selectively control either SDRAM (SDR synchronous DRAM) or DDR DRAM (DDR asynchronous DRAM).

FIG. 5 illustrates a state diagram of the set and reset states of latch 42 (FIG. 4). A set state 50 occurs during a power-on reset (PWR_ON) at which the computing system is initiated. During a set state, the input signal on, for example, a data pin can be read ($RD\_DQ_n$) or a configuration register can be read (RD_CONFIG_REG). Set state 50 remains in the set condition to latch whatever is present on the set input until reset state 52 occurs. The reset state can occur during a power-off (PWR_OFF) or can possibly occur during a power-on (PWR_ON) operation immediately before a set state occurs. Once the latch is reset, then it remains reset until power-on occurs or, in the alternative, a set state is initiated.

Although the invention has been described in connection with specific preferred embodiments, it should be understood that the invention as claimed should not be unduly limited to such specific embodiments. Specifically, the memory controller is claimed as that which is adaptable to either SDR or DDR applications. If the memory controller is clocked at substantially one-half the system clock rate, the overall data transfer rate nonetheless remains the same as an SDR application. However, there is considerably less power consumption when using one-half the system clock rate. In addition, if DDR is used then the memory controller is adaptable to SSTL_2 output buffers and input receivers, which further reduce the power supply required over that of SDR LVTTL specification. By clocking the memory controller at one-half rate, expensive flip-chip and ball-grid array packaging schemes can be avoided. Instead, wire bonding can be used to accommodate the lower frequency signals without risk of undue impedance effects. Thus, the rather expensive 4-layer PCB substrate and expensive flip-chip packaging can be eliminated in favor of the lower priced thin small outline packages (TSOP) or quad flat pack (QFP) packages mounted to a single layer board.

The integrated circuit that contains the execution engine can utilize a system clock which transitions at a rather high frequency since the memory controller need only transition at one-half the execution unit. More specifically, the DDR DRAM is suited for slower speeds and one need not purchase the more expensive higher speed DRAM devices. Another advantage is the ability to use whatever is cheaper and more readily available in the memory marketplace. For example, if SDR is cheaper, then SDR can be readily used. Conversely, if DDR becomes cheaper, then DDR can be more readily used. This provides insurance against sudden DRAM market changes and is applicable to any integrated circuit that utilizes a memory controller. If the market gravitates to DDR, then most microprocessor manufacturers will implement less cache size on the integrated circuit. DDR may also prove advantageous in lower power applications since DDR DRAMs are provided with SSTL_2 logic voltage values that are at 2.5 volts or lower. It appears that the personal computer (PC) market and the networking market may be gaining favor toward DDR; however, new markets are also opening to DDR such as cellular phones and consumer electronics (e.g., video and digital television).

Regardless of the direction of the market, however, the present memory controller is adaptable to whatever form of DRAM might be used and, accordingly, the structures and methods described herein or within the scope of the present claims and their equivalents, are covered thereby.

What is claimed is:

1. An integrated circuit, comprising:
   an execution engine clocked at a first clock rate;
   a memory controller selectively clocked at either the first clock rate or a second clock rate that is approximately one half frequency of the first clock rate;
   a multiplexer coupled to receive a first clock that transitions at the first clock rate and a second clock that transitions at the second clock rate; and
   wherein the multiplexer is coupled to receive a select signal that remains in a set state from a time in which the integrated circuit receives a power-on reset until the integrated circuit receives a subsequent power-on reset, and thereafter transitions to a reset state such that the logic value of the set state and complementary reset state of the select signal determines whether the output from the multiplexer to a clocking input of the memory controller will produce either the first clock rate or the second clock rate.

2. The integrated circuit as recited in claim 1, wherein the memory controller is adapted to produce the same data transfer rate to and from the integrated circuit regardless of whether the memory controller is clocked at either the first clock rate or the second clock rate.

3. The integrated circuit as recited in claim 1, wherein the memory controller clocked at the first clock rate latches data on every other transition whereas the memory controller clocked at the second clock rate latches data on every transition.

4. The integrated circuit as recited in claim 1, further comprising:
   an input pin of the integrated circuit;
   a multiplexer; and
   a latch having an input coupled to the input pin and an output coupled to a select input of the multiplexer for placing either the first clock rate or the second clock rate upon a clocking input of the memory controller depending on a logic value of the signal placed on the input pin.

5. The integrated circuit as recited in claim 1, further comprising:
   a configuration register adapted to store a logic value;
   a multiplexer; and
   a latch having an input coupled to the configuration register and an output coupled to a select input of the multiplexer for placing either the first clock rate or the second clock rate upon a clocking input of the memory controller depending on the logic value stored within the configuration register.

6. The integrated circuit as recited in claim 1, wherein the memory controller is coupled to receive a power supply voltage less than 2.5 volts.

7. The integrated circuit as recited in claim 1, wherein the integrated circuit comprises a plurality of bonding pads wire bonded to corresponding leads emanating from the integrated circuit.

* * * * *